United States Patent [19]

Mizumoto et al.

[11] Patent Number: 4,631,263

[45] Date of Patent: Dec. 23, 1986

[54] WATER-REPELLENT CATALYST FOR GAS/LIQUID REACTIONS AND PROCESS FOR GAS/LIQUID REACTIONS BY USING THE SAME

[75] Inventors: Mamoru Mizumoto; Hisao Yamashita, both of Hitachi; Shinpei Matsuda, Toukai; Kazuhiko Yamaguchi, Urayasu, all of Japan

[73] Assignee: Hitachi, Ltd., Tokyo, Japan

[21] Appl. No.: 787,077

[22] Filed: Oct. 15, 1985

Related U.S. Application Data

[63] Continuation of Ser. No. 458,988, Jan. 18, 1983, abandoned.

[30] Foreign Application Priority Data

Jan. 18, 1982 [JP] Japan ................................. 57-4998

[51] Int. Cl.$^4$ .......................... B01J 31/06; B01J 35/00
[52] U.S. Cl. ........................................ 502/159; 502/4; 502/527; 423/580; 423/648 R
[58] Field of Search .......................... 502/4, 159, 527; 423/580, 648 A, 648 R

[56] References Cited

U.S. PATENT DOCUMENTS

| | | | |
|---|---|---|---|
| 3,888,974 | 6/1975 | Stevens | 423/580 |
| 3,981,976 | 9/1976 | Stevens | 423/580 |
| 4,025,560 | 5/1977 | Rolston et al. | 423/648 A |
| 4,073,748 | 2/1978 | Brown et al. | 252/428 |
| 4,217,332 | 8/1980 | Hindin et al. | 423/249 |
| 4,228,034 | 10/1980 | Botler et al. | 252/430 |
| 4,259,209 | 3/1981 | Nakane et al. | 252/430 |
| 4,332,698 | 6/1982 | Bernstein et al. | 252/477 R |
| 4,350,610 | 9/1982 | Jung et al. | 252/429 R |
| 4,471,014 | 9/1984 | den Hartog et al. | 423/580 |

OTHER PUBLICATIONS

G. C. Bond, P. B. Wells, F. C. Tompkins, "Separation of Rate Processes for Isotopic Exchange between Hydrogen and Liquid Water in Packed Columns", Sixth International Congress on Catalysis, pp. 747–757 (Jul. 1976).

*Primary Examiner*—Andrew H. Metz
*Assistant Examiner*—Anthony McFarlane
*Attorney, Agent, or Firm*—Antonelli, Terry & Wands

[57] ABSTRACT

A catalyst for gas/liquid reactions, characterized by having a sheet or film-form water-repellent porous carrier having gas permeability and liquid impermeability and a catalytically active component supported on at least one surface of said carrier.

5 Claims, 7 Drawing Figures

WATER-REPELLENT CATALYST FOR GAS/LIQUID REACTIONS AND PROCESS FOR GAS/LIQUID REACTIONS BY USING THE SAME

This is a continuation of application Ser. No. 458,988, filed Jan. 18, 1983, now abandoned.

BACKGROUND OF THE INVENTION

1. Field of the Invention

This invention relates to a catalyst for gas/liquid reactions and a process for gas/liquid reactions, more particularly, to a catalyst suitable for application to a process for enriching heavy water by the isotopic exchange reaction between water and hydrogen gas and to a process for gas/liquid reactions by using such a catalyst.

2. Description of the Prior art:

In a process for producing heavy water by the isotopic exchange reaction between water and hydrogen gas, a catalyst having water repellency has been used to obtain an increased rate of reaction. There have been proposed a process in which a hydrophilic catalyst is coated with polytetrafluoroethylene to render the catalyst water-repellent (U.S. Pat. No. 3,981,976) and a process in which a water-repellent organic polymer is allowed to support a catalytically active component such as platinum, rhodium or nickel (U.S. Pat. No. 4,025,560). Most of such catalysts are prepared by embedding a catalytically active component into voids of a porous carrier having the form of sphere or cube measuring several millimeters in side by impregnation or other methods. For example, catalysts prepared by impregnating a carrier consisting of 3 mm-side cubes of porous polytetrafluoroethylene with platinum were disclosed in the above-mentioned U.S. Pat. No. 4,025,560. These catalysts are packed into a reacton tube, through which gas and liquid are passed. The gas and the liquid are brought into contact with the surfaces of the spherical or cubic form catalyst and establish three-phase interfaces.

SUMMARY OF THE INVENTION

The object of this invention is to produce a water-repellent catalyst for gas/liquid reactions which establishes three-phase interfaces more easily than the above-mentioned spherical or cubic form catalyst and to provide a process for gas/liquid reactions, comprising using such a water-repellent catalyst capable of easily establishing three-phase interfaces.

The water-repellent catalysts of this invention have a sheet or film-form water-repellent porous carrier having gas permeability and liquid impermeability and a catalytically active component supported on at least one surface of said carrier.

BRIEF DESCRIPTION OF THE DRAWINGS

FIG. 1 is a perspective view showing an example of a catalyst according to this invention. FIG. 2 is a cross sectional view illustrating a state wherein the catalyst is placed in water and hydrogen is introduced thereinto. The water-repellent catalyst 1 of this invention consists of a catalyst prepared by loading a catalytically active component 3 on at least one surface of a sheet or film-form water-repellent porous carrier 2. When such a water-repellent catalyst is used in water, the surfaces of the catalyst contact with water but repels the water because of water repellency, forming water drops 4 on the surfaces of the catalyst. Because of liquid impermeability, the liquid does not penetrate into the catalyst. Part of the hydrogen introduced into water moves in the direction shown by a broken arrow 5a and reaches interfaces between the catalyst and water. Another part of the hydrogen, after having reached the surfaces of the catalyst, further permeates the carrier 2 in the direction as shown by an arrow 5b and reaches interfaces between water and the catalytically active component. When the water-repellent catalyst of this invention is used, it becomes possible that the gas passes not only over the surfaces of the catalyst but also through the interior of the catalyst and, accordingly, three-phase interfaces are easily formed, and the rate of reaction can be increased.

Figure 1:
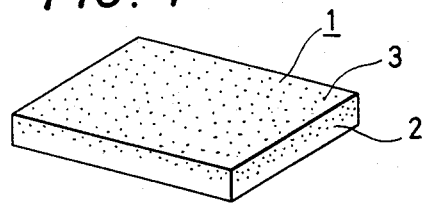
FIG. 1 is a perspective view showing an example of a catalyst of this invention.
Figure 2:
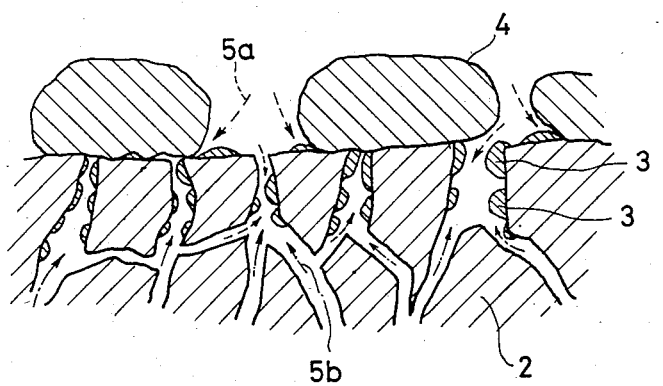
FIG. 2 is a cross sectional view showing a state in which the catalyst of this invention is used in water.

According to the study of the inventors of this invention, gas/liquid reactions in the presence of a water-repellent catalyst proceed through formation of three-phase interfaces on the surfaces of the catalyst, and the inside of the catalyst is never or scarcely used as sites for the reaction. Accordingly, it is necessary to load the catalytically active component on at least the surface of the carrier. According to the present invention, it is not necessary at all to form a thick carrier layer.

In the spherical or cubic form water-repellent catalysts mentioned as catalysts in the prior arts, active components are present not only on the surfaces necessary for formation of three-phase interfaces but also inside the carrier. When viewing the catalyst as a whole, it may be said that the amount of the active component inside the carrier rather predominates over that present on the surface.

The present invention can be applied not only to the heavy water-enriching process by the isotopic exchange reaction between water and hydrogen but also to wide range of gas/liquid reactions. Gas/liquid reactions include reactants consisting of gas and liquid and effect a chemical conversion between these reactants. In addition to a water-hydrogen isotopic exchange reaction, such gas/liquid reactions include, for example, the following processes:

(1) process for enriching and removing tritium contained in the waste water from a light-water reactor, a heavy-water reactor, a nuclear fuel reprocessing plant, etc., (2) process for chemical conversion of organic or inorganic substances in an aqueous solution with the aid of an oxidizing gas, a reducing gas, etc.

The water-repellent catalyst of this invention has water repellency on at least part of the surface of its sheet or film-form carrier, and so it is not entirely coated with liquid and permits gas to reach the surface.

Such a catalyst can be prepared by subjecting a carrier to a water repellency-imparting treatment or by loading a catalytically active component on a water-repellent carrier.

As the carrier for the catalyst, there can be used hydrophilic carriers such as alumina, silica, silica-alumina, titania or active carbon. These hydrophilic carriers can be rendered water-repellent by treating them with a solution or suspension of a water-repellent substance such as silicone oil, polystyrene, paraffin or wax. As the water-repellent carriers, there can be used a variety of organic polymers such as polytetrafluoroethylene, polyvinylidene fluoride, fluorinated graphite, polyethylene, polypropylene, polystyrene, polymethyl methacrylate, paraffin, and polyalkylsilicone. Since thin plates of porous polytetrafluoroethylene are commercially available, they are conveniently used as carriers to support catalytically active components.

It is desirable that the carriers have a mean pore size of 0.1 to 10 $\mu$m and a porosity of 50 to 95%.

Extremely thin plates, i.e., those having a thickness of not greater than 100 $\mu$m are specially termed as membranes. In case where the catalytically active component is supported by a film-form carrier, the gas permeability can be maintained even when the catalytically active component is loaded on the entire carrier. The thickness of a film or plate carrier is desirably within a range of 10 to 100 $\mu$m.

The catalytically active components are loaded on a carrier by dissolving, for example, a metal salt solution in an organic solvent (acetone, alcohols or the like) and impregnating the carrier with the resulting solution. There may be enumerated as catalytically active components nobel metals such as Pt, Ru, Rh, Ir or their alloys.

As the thickness of the layer of the supported catalytically active component increases, the gas permeability decreases. If the thickness is below 100 $\mu$m, the gas permeability is not lost. A reduction in thickness of the supported layer is accompanied by a decrease in the amount of the active component and produces an effect of saving materials, shortening catalyst preparation time or the like. The preferable thickness of the layer ranges from 50 $\mu$m to the thinnest thickness. The thinnest thickness is about 50 Å. A preferable amount of catalyst placed on the carrier is 0.1 to 10 wt %. The amount per unit area of the exposed surface of the carrier is preferably within a range of 15 to 2,000 mg/m$^2$ in case that the catalyst is supported on one surface of the carrier. In case that the catalyst is supported on both surfaces of the carrier, a preferable amount of per unit area is 7.5 to 1,000 mg/m$^2$.

In case where the catalyst of this invention is used, it is preferred that passages for liquid and passages for gas are separated by diaphragms consisting of the sheet or film-form water-repellent catalyst and the diaphragms are disposed such that at least the surface carrying the catalytically active component faces the passages for liquid. This allows gas to reach easily the surfaces of the catalytically active component facing the passages for liquid and to establish three-phase interfaces easily.

Figure 3:
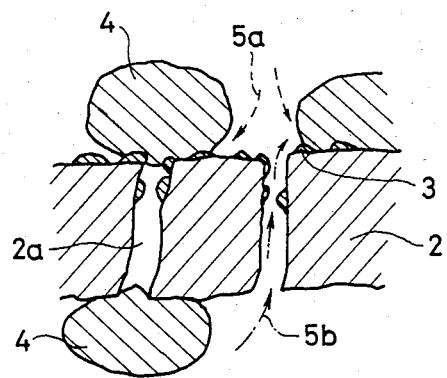
FIG. 3 is a cross sectional view showing a state in which the entire surfaces of a catalyst is in contact with water.
Figure 4:
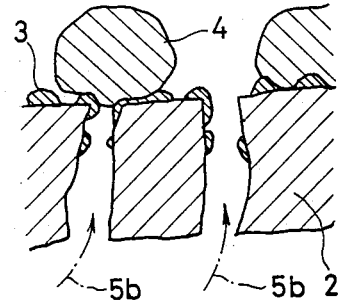
FIG. 4 is a cross sectional view showing a state in which one surface of a sheet or film-form catalyst is in contact with water and another surface is in contact with hydrogen gas.
Figure 5:
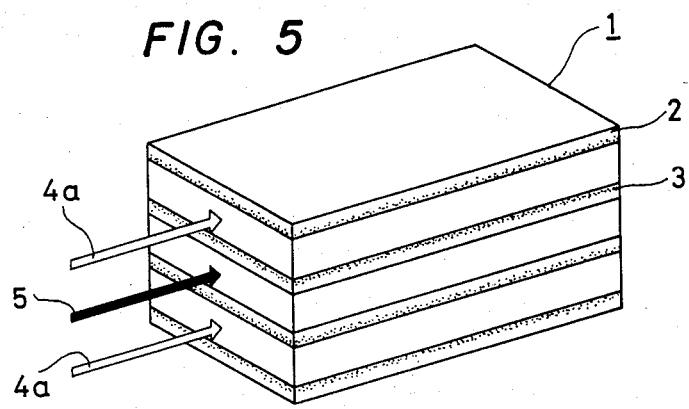
FIGS. 5 and 6 are perspective views showing states in which a plurality of the catalysts of this invention are arranged.

FIG. 3 is a cross sectional view showing the vicinity of a water-repellent catalyst in case where water and hydrogen are simultaneously passed through one flow passage. When a water-repellent catalyst is used in water, most of the pores 2a are blocked with water drops 4. Because hydrogen does not permeate pores 2a thus blocked with water drops 4, the catalytically active component present in these pores cannot be utilized to form three-phase interfaces. The hydrogen permeating the pores of the carrier 2 in the direction shown by an arrow 5b and the hydrogen moving into water in the direction shown by an arrow 5a reach the interfaces between the water drops and the catalytically active component and establish three-phase interfaces. In contrast with this, in case where the passage for water is separated from the passage for hydrogen by a catalyst, as shown in FIG. 4, blocking of carrier pores by water drops 4 does not occur. Accordingly, three-phase interfaces can easily be established. In case where water passages and hydrogen passages are separated by a catalyst having a catalytically active component supported on only one surface of the carrier, the surface carrying the catalytically active component must face the water passages as shown in FIG. 5.

In practicing a gas/liquid reaction by using the water-repellent catalyst of this invention, it is preferred to arrange a plurality of diaphragms consisting of a catalyst so as to form hydrogen passages and water passages alternately one by one. The sizes of the passages between adjacent catalysts is preferably 0.1 to 50 cm. FIG. 5 illustrates an example of a catalyst prepared by arranging four sheets of catalyst diaphragms in parallel so as to form water passages 4a and a hydrogen passage 5 alternately one by one. The number of the diaphragms consisting of the catalyst 1 is not limited to four, but any number of sheets can be used. The outermost diaphragms in case where the arrangement is as shown in FIG. 5 do not necessarily consist of the catalyst. In FIG. 5, the water flow 4a and the hydrogen flow 5 are cocurrent with each other but can be countercurrent or cross each other at a right angle or obliquely. The directions of gas and liquid flows can be freely selected. Thus, when the gas passages and the liquid passages are formed alternately one by one, it becomes possible to utilize one passage in common to two catalyst diaphragms. Accordingly, there is obtained an effect of reducing the size of a reaction apparatus. In a process comprising packing a spherical or cubic form catalyst into a reaction tube and passing gas and liquid therethrough, a phenomenon that the liquid flows along only the wall of the reactor or passes through only a localized zone of the packed catalyst occurs, so that most of the catalyst cannot be utilized for the reaction. If the gas passages and the liquid passages are separated from each other by using the water-repellent catalyst as diaphragms, the entire surfaces of the catalyst can be utilized for establishing three-phase interfaces. Accordingly, there is also obtained an effect of enhancing the efficiency of the catalyst per unit weight.

Figure 6:
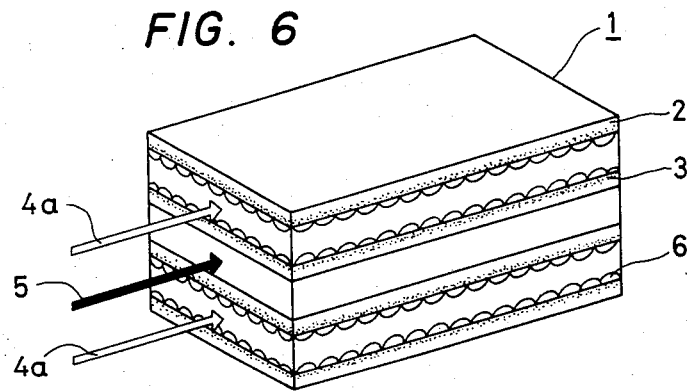

In case where a sheet or film-form water-repellent catalyst is used, it is preferred that the catalyst is supported by a support member. FIG. 6 illustrates an embodiment in which four parallel sheets of the water-repellent catalyst are supported by support members 6. The support members 6 can play a role of preventing the diaphragms consisting of a water-repellent catalyst 1 from being damaged or deformed during assembling, transportation or like handling of the reaction apparatus. The material of the support member in this case is preferably one having the highest possible mechanical strength or one having a mechanical strength which is at least higher than that of the catalyst 1. It is also possible to give the support members 6 a function of lengthening a liquid retention time on the catalyst surface. In this case, it is necessary to dispose the support members 6 so as to face liquid passages and it is preferred to use a hydrophilic material for the support members. FIG. 6 illustrates an example in which support members 6 are provided to face the liquid passages. The structure of support members in this case is preferably one having pores, such as a fine-wire net, a lattice-form plate punched by a press or the like. Metallic nets are most suitable as support members because they are easily available and have sufficient strength. If a hydrophilic net-like support member is provided to face the liquid passage, the liquid wets the support member and is held temporarily on the meshes. This facilitates contact of the liquid with the catalyst and promotes formation of liquid drops on the catalyst surfaces. As the liquid drops increase, the sites for three-phase interfaces increase. This allows the reaction to proceed more rapidly.

The catalyst can be placed in the form of a coil within a reaction tube. A coil spacing can easily be maintained by supporting, before forming into a coil, one or both of the surfaces of a sheet or film-form catalyst by a net-like support member.

This invention will be described below concretely with reference to examples, but it should be noted that they are mere examples of this invention and this invention is not limited to these examples.

EXAMPLES

EXAMPLE 1

A film (50 μm thick) of a porous polytetrafluoroethyle carrier was impregnated with an acetone solution of chloroplatinic acid, dried and reduced by holding it at 200° C. for 2 hours in a hydrogen atmosphere. The amount of supported platinum as a catalytically active component was 6.1% by weight. An amount of supported Pt was 0.24 g and the total weight of the catalyst was 3.9g.

EXAMPLE 2

A film-form water-repellent catalyst was prepared in the same manner as in Example 1, except that the chloroplatinic acid was replaced with palladium chloride. The amount of supported palladium was 5.4% by weight. An amount of supported Pd was 0.21 g and the total weight of the catalyst was 3.8 g.

COMPARATIVE EXAMPLE 1

Platinum was attached to the entire surfaces of 5 mm-side cubes having a 1 mm thick porous polytetrafluoroethylene carrier in the same manner as in Example 1. The amount of supported platinum was 1.5% by weight. This water-repellent catalyst (330 cc) was packed into a reaction tube. An amount of supported Pt was 0.88 g and the total weight of the catalyst was 175 g.

COMPARATIVE EXAMPLE 2

A catalyst was prepared in the same manner as in Comparative Example 1 except that the platinum was replaced with palladium. An amount of supported Pd was 0.88 g and the total weight of the catalyst was 175 g.

EXPERIMENTAL EXAMPLE

Figure 7:
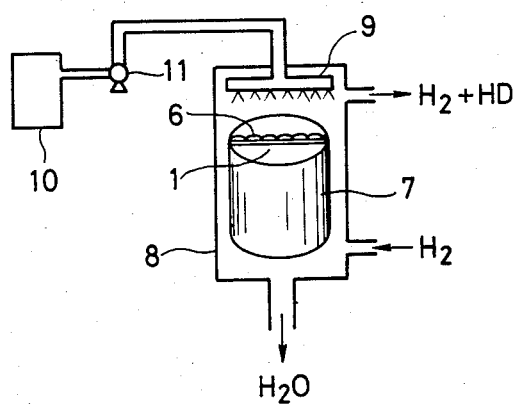
FIG. 7 is a schematic structural view of a reaction apparatus used in experiments for measurement of the catalytic activity.

The catalytic activity was measured by carrying out an isotopic exchange reaction between water and hydrogen by use of each of the catalysts of Examples 1 and 2 and Comparative Example 1 and Comparative Example 2. The activity was measured by using a reaction apparatus having a structure shown in FIG. 7. In FIG. 7, 7 is a reaction tube, 8 is a reaction tower, 9 is a shower for injecting water containing heavy water, e.g., natural water, 10 is a tank for water containing heavy water and 11 is a pump. The reactor is constructed that heavy water-containing water flows from the upper part of the reaction tower to its lower part and hydrogen gas flows from its lower part to its upper part.

The catalysts of Example 1 and 2 were cut into sheets (10 cm wide, 210 cm long) supported on a corrugated brass net (20 mesh) and then placed in a reaction tube 7. Water containing 10% by volume of heavy water was passed through the reaction tower at a rate of 30 cc/min and hydrogen gas was passed upward at a rate of 20 l/min (linear velocity 0.1 m/sec).

The isotopic exchange reaction between water and hydrogen in this invention took place according to the following reaction formula:

$$HDO\ (l) + H_2\ (g) \rightarrow HD\ (g) + H_2O\ (l),$$

wherein (l) denotes a liquid state and (g) denotes a gaseous state.

The catalytic activity in this reaction was evaluated by the rate constant of a catalytically active component, $K_ya^*$, which can be determined according to the following expression:

$$K_ya^* = \frac{1}{W}\left(\frac{F}{h}\ ln\frac{1}{1-n}\right),$$

where in F is the linear velocity of hydrogen gas, h is the height of catalyst in the reaction tube and n is the degree of completion of equilibrium which is determined according to the following expression:

$$n = \frac{X_i - X_o}{X_i - X_{eq}},$$

where $X_i$ is heavy hydrogen concentration at the inlet of the reaction tower, $X_o$ is heavy hydrogen concentration at the outlet, and $X_{eq}$ is heavy hydrogen concentration in equilibrium.

The greater the $K_ya^*$ value, the higher the efficiency of the active component per unit weight and the higher the catalytic activity. High activity can be regarded as manifestation of a fact that the contact of water with hydrogen on the catalyst is facilitated with a consequent increase in the sites for three-phase interfaces. The results of measurement are shown in the table:

TABLE

| | $K_ya^*$ (m³/kg · sec) |
|---|---|
| Ex. 1 | 0.22 |
| Ex. 2 | 0.12 |
| Compar. Ex. 1 | 0.045 |
| Compar. Ex. 2 | 0.030 |

As has been described, it is possible to facilitate establishment of three-phase interfaces in gas/liquid reactions by using the water-repellent catalyst of this invention. When the process for gas/liquid reactions according to this invention is applied, gas can reach the catalyst surfaces more easily and accordingly the establishment of three-phase interfaces becomes more easy.

EXAMPLE 3

The following catalysts were prepared in the same manner as in Example 1, except that ruthenium trichloride, rhodium trichloride and iridium tetrachloride were dissolved in aceton : The first catalyst consists of 5.4 wt % of Ru and a teflon carrier, the second catalyst consists of 6.0 wt % of Rh and a teflon carrier, and the third catalyst consists of 5.5 wt % of Ir and a teflon carrier.

Then the same experiments as in Example 1 were conducted using the above catalysts, and results were as follows.

|  | Kya* (m$^3$/kg · sec) |
| --- | --- |
| Ru - catalyst | 0.15 |
| Rh - catalyst | 0.24 |
| Ir - catalyst | 0.19 |

We claim:

1. A water-repellent catalyst assembly for promoting a three-phase interface in gas/liquid reactions comprising a catalyst consisting of a carrier formed of a sheet or film consisting of a water-repellent porous polytetrofluoroethylene, said carrier having a mean pore size of 0.1 to 10 μm to provide gas permeability and liquid impermeability and a thickness of 10 to 100 μm, and a catalytically active noble metal carried directly on at least one surface of said carrier, the amount of the catalytically active noble metal being 0.1 to 10 weight % with respect to the total weight of said carrier and said catalytically active noble metal; and a hydrophilic supporting member disposed on the surface of said carrier where the catalytically active noble metal is carried, thereby facilitating contact of liquid with said catalytically active nobel metal and promoting formulation of liquid drops on the surface of the carrier.

2. A water-repellent catalyst assembly for gas/liquid reactions as set forth in claim 1, wherein said hydrophilic supporting member is made of a metallic net.

3. A water-repellent catalyst assembly for gas/liquid reactions as set forth in claim 1, wherein said catalytically active noble metal is carried on at least one surface of said sheet or film and has a thickness of from 50 μm to about 50 Å.

4. A water-repellent catalyst assembly for gas/liquid reactions as set forth in claim 1, wherein said catalytically active noble metal is Pt, Ru, Rh, Ir or an alloy thereof.

5. A water-repellent catalyst assembly for gas/liquid reactions as set forth in claim 1, wherein a plurality of the catalysts are arranged as parallel diaphragms to form alternate gas and liquid passages therebetween, with a hydrophilic supporting member of each carrier facing another hydrophilic supporting member whereby a liquid passage is defined by the facing hydrophilic supporting members.

* * * * *